(12) United States Patent
Prasad

(10) Patent No.: US 9,021,280 B1
(45) Date of Patent: Apr. 28, 2015

(54) POWER SAVING FOR FIFO BUFFER WITHOUT PERFORMANCE DEGRADATION

(71) Applicant: PMC-Sierra US, Inc., Sunnyvale, CA (US)

(72) Inventor: Janardan Prasad, Bangalore (IN)

(73) Assignee: PMC-Sierra US, Inc., Sunnyvale, CA (US)

( * ) Notice: Subject to any disclaimer, the term of this patent is extended or adjusted under 35 U.S.C. 154(b) by 284 days.

(21) Appl. No.: 13/796,431

(22) Filed: Mar. 12, 2013

(51) Int. Cl.
*G06F 1/32* (2006.01)

(52) U.S. Cl.
CPC .................................. *G06F 1/3275* (2013.01)

(58) Field of Classification Search
USPC .................................. 713/300, 320, 323, 324
See application file for complete search history.

(56) References Cited

U.S. PATENT DOCUMENTS

| | | | |
|---|---|---|---|
| 5,860,106 A * | 1/1999 | Domen et al. ................. | 713/324 |
| 7,899,993 B2 | 3/2011 | Knoth | |
| 8,321,609 B2 * | 11/2012 | Lin et al. .......................... | 710/52 |
| 2005/0210206 A1 * | 9/2005 | Woodbridge et al. ......... | 711/154 |
| 2006/0195707 A1 * | 8/2006 | Rychlik ........................ | 713/300 |
| 2008/0109670 A1 * | 5/2008 | Johansson et al. ............ | 713/324 |
| 2009/0285045 A1 * | 11/2009 | Vogel et al. .................... | 365/221 |
| 2011/0173474 A1 * | 7/2011 | Salsbery et al. .............. | 713/323 |
| 2013/0138897 A1 * | 5/2013 | Mirza ............................ | 711/154 |

OTHER PUBLICATIONS

Folegnani et al., "Energy-Effective Issue Logic", 2001, IEEE, pp. 230-239, USA.
Chang et al., "A Robust Ultra-Low Power Asynchronous FIFO Memory With Self-Adaptive Power Control", 2008, IEEE, pp. 175-178, USA.
Hur et al., "A Comprehensive Approach to DRAM Power Management", HPCA, Feb. 16-20, 2008, IEEE, pp. 305-316, USA.

\* cited by examiner

*Primary Examiner* — Vincent Tran
(74) *Attorney, Agent, or Firm* — Dennis R. Haszko

(57) ABSTRACT

A power-saving method for a first-in-first-out (FIFO) buffer implemented in a memory. The memory is segmented into a plurality of logical segments. For each logical segment, for each power saving mode, a recovery time and recovery overhead to an operational mode, and a transition overhead for transitioning the logical segment into the power saving mode, are determined. During each clock cycle, a determination is made as to whether a net power saving will result by entering each logical segment into a power saving mode based on a minimum time before a read or write pointer will enter the logical segment as well as the recovery time, the recovery overhead, and the transition overhead. The logical segment is transitioned to the power saving mode only if a net power saving will result, and is returned to the operational mode when the minimum time is no longer greater than the recovery time.

20 Claims, 6 Drawing Sheets

POWER SAVING FOR FIFO BUFFER WITHOUT PERFORMANCE DEGRADATION

FIELD

The present disclosure relates generally to integrated circuits and microprocessors. More particularly, the present disclosure relates to power savings methods for first-in, first out buffers implemented in random access memory.

BACKGROUND

First-in-first-out (FIFO) circular and ring buffers are among the most commonly used building blocks in integrated circuit and microprocessor (or, chip) design for various purposes such as buffering, flow control, latency stealing, and so forth. In general, FIFO's are used to maintain in-order processing of processes and queues.

FIG. 1 shows a schematic diagram of a known system 10 implementing a FIFO buffer in RAM 20. The FIFO in RAM has a predetermined depth $2^D$ where D is a positive integer excluding zero (i.e. D=1, 2 . . . ). Hardware FIFO's are typically implemented using read and write pointers which are used to generate read and write addresses, resulting from the read address generation function 30 and write address generation function 40 which operate in accordance with preconfigured read pointer generation logic 50 and write pointer generation logic 60, as shown in FIG. 1 Keeping track of the full and empty status of a FIFO is important because any reliable system cannot tolerate data loss or transfer of stale data. This is represented as the full and empty generation logic function 70 shown in FIG. 1.

In order to keep accurate track of full and empty status, typical read and write pointers are configured to be one bit wider than the width required to specify the FIFO read and write addresses. By using this additional most significant bit (MSB), it may be determined whether the FIFO is approaching a full state or an empty state. In typical implementations, if the read and write pointer MSB's are equal, then this is an indication that the read pointer is chasing the write pointer. Conversely, if the read and write pointer MSB's are unequal, then this is an indication that the write pointer is chasing the read pointer.

Large FIFO's are commonly implemented in random access memory (RAM). RAM chip power consumption is an ongoing concern, however, as the amount of RAM included in chips continues to grow as fabrication technologies involve smaller and smaller scales (e.g. 28 nm or 40 nm fabrication technologies). Leakage power is a dominant factor in small scale fabrication technologies and it sometimes contributes at least 20-30% of total power consumption in typical chips. The power consumed by FIFO's in many telecommunication and storage chips presents a significant disadvantage and thus needs to be addressed.

Current RAM often provides multiple power saving modes which reduce the voltage to parts of the RAM or power gate it. Different names specific to particular vendors are used to designate these different power saving modes. For example, the terms "light sleep", "deep sleep", and "power gating" are sometimes used. In this instance, light sleep provides the least power saving, while deep sleep provides greater power saving, and power gating provides the greatest power saving. Similarly, recovery time (time to restore to operation) from light sleep is the shortest, while deep sleep requires a longer recovery time, and power gating requires the longest recovery time.

The above modes are just examples and can vary from vendor to vendor and technology to technology. For example, ARM™ 28 nm RAM's have four modes called "selective pre-charge", "RET1", "RET2", and "power gating".

Whatever the power saving modes provided, each mode will enable power saving while using RAM in any application including FIFO, but will also introduce transition overhead. In other words, the transition from one mode to another typically consumes power. Clearly, there will be a net cost if the overhead of the transitions to and from a power saving mode is greater than the power saving gained by switching to that mode over the relevant period. In such case, it is preferable not to transition to the power saving mode, but instead to remain in the current mode.

In typical implementations of power saving modes for FIFO's implemented in RAM, the decision to enter power saving mode is based on the traffic behavior of the FIFO. For example, if there is no traffic to or from the FIFO for a certain duration, then the RAM is transitioned into one of the available power saving modes. In some cases, the selection of mode is performed on a per cycle basis. These methods are generally based on certain predictions and have a number of disadvantages.

For example, in some implementations the RAM is transitioned to a power saving mode when no traffic to the FIFO occurs within a predetermined duration. If the prediction based on the predetermined duration is incorrect, however, and traffic to the FIFO recommences at the moment the power saving mode is entered, the traffic must be stalled and the RAM returned to the normal, operational mode. As a result, performance is lost as traffic was stalled for certain duration (while transitioning from power saving mode to normal mode) and additional power is consumed as transitions between different modes consumes excess power, as noted above.

In some implementations the decision to enter a power saving mode is made on a per clock cycle basis. Transition from the power saving mode to the normal, operational mode takes time, however, including typically at least a couple of clock cycles dependent upon technology and frequency of operation. At higher clock frequencies it may not be feasible to make the decision on a per clock cycle basis as the clock period may not be sufficient to make the decision and meet the timing requirement of a mode. There are few RAM vendors having a strict sequence of steps to enter in a power saving mode and thus approaches wherein decisions are made on a per clock cycle basis may not apply.

Further methods which do not overcome the above disadvantages are disclosed in *Energy-Effective Issue Logic*, Daniele Folegnani and Antonio Gonzalez, 2001 IEEE; and *A Robust Ultra-Low Power Asynchronous FIFO Memory With Self-Adaptive Power Control*, M. Chang, P. Huang, and W. Hwang, 2008 IEEE.

In any event, and as illustrated above, methods which base the decision to enter a power saving mode on traffic prediction tend to be inefficient and suffer performance degradation and higher power consumption in certain cases.

There remains a need, therefore, of a power saving solution for FIFO's without performance degradation.

BRIEF DESCRIPTION OF THE DRAWINGS

Embodiments of the present invention will now be described, by way of example only, with reference to the attached Figures, wherein.

DETAILED DESCRIPTION

The power saving method described herein for a FIFO logically divides the FIFO in RAM into multiple segments or regions. The FIFO read and write pointers' current locations are used to determine a minimum time, in terms of clock cycles, before the next access to each segment can occur. A determination of whether to enter any particular segment into a given power savings mode depends upon whether the power saving expected over the minimum time to access that segment is greater than the overhead of transitioning it to and from the power savings mode.

While the specific embodiments described herein concern a FIFO implemented in RAM, it will be appreciated that any other form of memory may be substituted so long as it bears the characteristics and enables the functionality described herein.

In the embodiments described below, the power saving modes will be referenced as "light sleep", "deep sleep", and "power gating" modes in accordance with the descriptions given above. It will be understood, however, that any number and name of power saving modes may be used in accordance with the principles disclosed herein.

Figure 1:
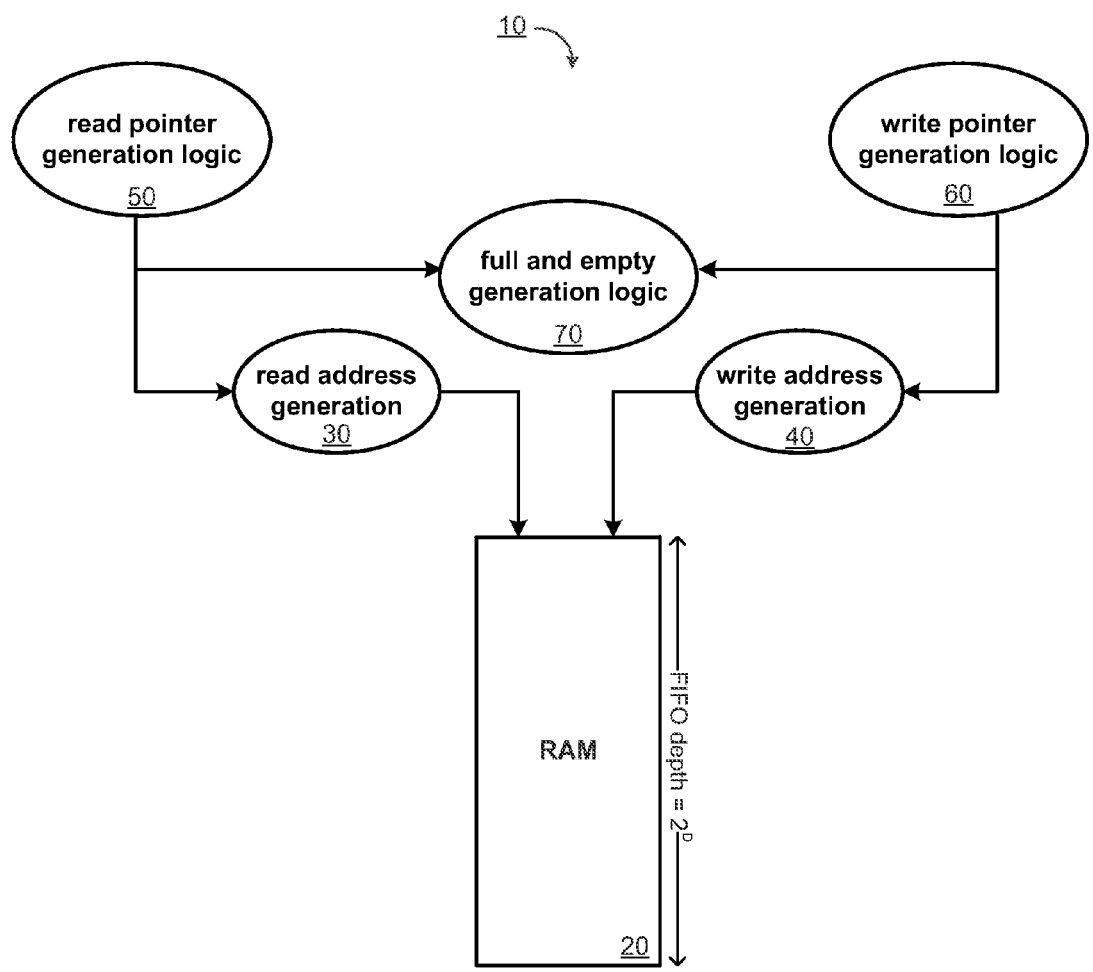
FIG. 1 is a schematic diagram of a known system implementing a FIFO buffer in RAM.
Figure 2:
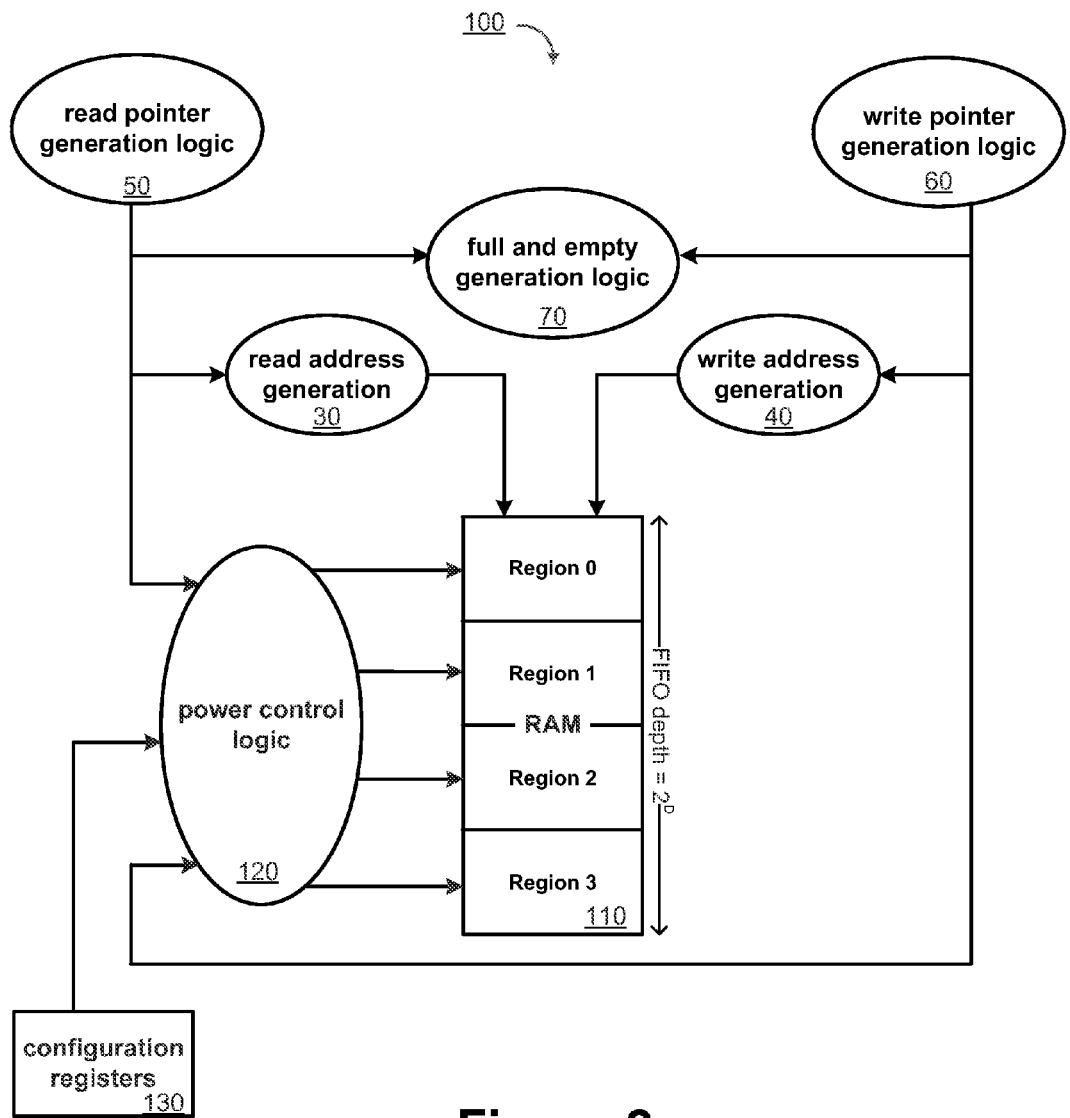
FIG. 2 is a schematic diagram of an inventive system implementing a FIFO buffer in RAM.

FIG. 2 shows a schematic diagram of an inventive system 100 including a FIFO buffer in RAM 110 which is modified over the FIFO buffer in RAM 20 of FIG. 1 so as to enable the described power saving method. The FIFO in RAM is split or segmented horizontally (that is, segmented by addresses and not by data structures) into smaller $2^N$ logical segments, wherein N is a positive integer excluding zero (i.e. 1, 2 . . . ). Each logical segment corresponds to a different portion or region of physical RAM. N may be selected based on any relevant factor including the particular memory compiler used and may be determined or restricted at least in part by the configuration of the particular RAM used. By way of illustration, FIG. 2 shows the RAM segmented into four logical segments labeled Region 0 through Region 3.

In one embodiment, the FIFO has a depth of $2^D$, and thus the read and write pointers will each be D+1 bits wide, the additional bit being the MSB used to track the full and empty status of the FIFO as described above. In one embodiment, the RAM is segmented into as many logical segments as the depth of the FIFO, and thus D=N. In another embodiment, each or at least one of the $2^N$ logical segments contains more than one element of the FIFO buffer, and thus D>N. Read and write pointer bits numbered D−1 to D−N indicate in which region the respective pointer is currently located (wherein it will be understood that the pointers are D+1 wide, including the full/empty MSB which by convention has a bit number of D, and thus the most significant bit of the pointer defining the FIFO address is bit number D−1).

It will be understood that segmenting the RAM into N logical segments is accomplished simply by the particular treatment accorded to those most significant bits of the read and write pointers (excluding the most significant bits tracking full and empty status) which together specify the address range of each logical segment. Thus, in general, the FIFO buffer in RAM 110 shown in FIG. 2 may be similar to the FIFO buffer in RAM 20 shown in FIG. 1. In general, RAM 110 is characterized by a plurality of segments having individually-controllable power saving modes, thus enabling the logical segmentation of the RAM into $2^N$ logical segments as discussed herein. In one embodiment, the RAM 110 is a collection of physical RAMs with each RAM corresponding to a logical segment.

The system 100 includes a read address generation function 30, write address generation function 40, read pointer generation logic 50, and write pointer generation logic 60, which may be identical or functionally similar to those shown in FIG. 1.

The system 100 includes a power control logic 120 which is configured to control a power saving mode of each individual one of the $2^N$ logical segments of the FIFO in RAM. The power control logic takes as input the outputs of the read pointer generation logic 50 and the write pointer generation logic 50 in order to determine the current read and write pointers and further to determine the full and empty state of the FIFO.

The power control logic may also take as input data stored in configuration registers 130. The configuration registers may store for each logical segment and for each power saving mode a recovery time for that combination of logical segment and power saving mode. The recovery time is the amount of time in clock cycles for the segment to be transitioned from that power saving mode to the 'on' state or operational mode.

In addition, the configuration registers may store for each logical segment and for each power saving mode: 1) a transition overhead for a transition from the 'on' state or operational mode to the power saving mode; 2) a transition overhead for a transition from the power saving mode to the 'on' state; and 3) a respective transition overhead for each transition from the power saving mode to a lower power saving mode (that is, a power saving mode which saves less power). For example, where there are three power saving modes—namely light sleep, deep sleep, and power gating—as well as an 'on' or operational mode—then the possible transitions may include transitions in either direction between: 'on' and light sleep; 'on' and deep sleep; and 'on' and power gating; and as well transitions from power gating to deep sleep or light sleep; and a transition from deep sleep to light sleep. By reference to the corresponding stored overheads, a total transition overhead for any combination of transitions from a first mode, to a second mode, and thence to a third mode (where the first and third modes may be the 'on' state), may be determined.

In one embodiment, each transition overhead may be expressed in terms of a number of clock cycles in the 'on' state, or operational mode. In other words, the amount of power consumed by transitioning to or from a power saving mode may be expressed by reference to the number of clock cycles in the 'on' state which would consume that amount of power. The overhead would then be a number of clock cycles calculated as follows:

Overhead=(Power consumed in entering in a mode and coming out of that mode for a segment)/ (Power Consumed per cycle in ON state for that segment)

In another embodiment, where the overhead for a particular transition is the same regardless of logical segment, then a representative overhead applicable to all of the logical segments for that transition may be stored in the configuration registers. In cases where the transition overhead for different logical segments is different—for example, where the different logical segments are of different size—then it is useful to store a separate transition overhead for each such logical segment.

In one embodiment, the configuration registers may include $3 \times 2^N$ registers storing the recovery time from each power saving mode to the 'on' state for each segment, and may further include $3 \times 2^N$ registers storing the transition overhead from and to each power saving mode and the 'on' state for each segment. For each one of the $2^N$ logical segments, a first register may store the recovery time from light sleep mode, a second register may store the recovery time from deep sleep mode, and a third register may store the recovery time from power gating mode. In each instance, the recovery time may be expressed in terms of a number of clock cycle periods. A fourth register may store the transition overhead to and from light sleep mode, a fifth register may store the transition overhead to and from deep sleep mode, and a sixth register may store the transition overhead to and from power gating mode.

It will be appreciated that the recovery time and transition overhead information stored in the configuration registers may be stored in other means known in the art, and that if the RAM supports additional or different power saving modes then the recovery times associated with those power saving modes may be stored.

The RAM segment currently pointed to along with the read and write pointer MSB (tracking full/empty) may be used by the power control logic to determine for each of the $2^N$ RAM segments a minimum time in terms of clock cycles before the pointer can reach that segment. Based on this minimum time and the overhead stored in the configuration registers for each RAM segment, the power control logic may calculate an optimal power saving mode for each RAM segment. In particular, the power control logic is configured to determine for each RAM segment whether a net power savings will result by transitioning to and from a power saving mode based on the overheads stored in the configuration registers and the minimum time before the FIFO pointer can reach that RAM segment.

In one embodiment, the power control logic may be configured to perform the method 200 shown in FIGS. 3A-3D for each of the $2^N$ RAM segments. Start indication block 210 indicates that decision block 220 determines whether either of the current read or write pointer is in the current RAM segment. If so (TRUE), then the segment is put into the 'on', or operational, state (step 230), and the method loops to decision block 220. If not (FALSE), then decision block 240 determines whether the RAM segment has unread data. This determination may be made based on the current read and write pointers, and the full/empty state indicated by their MSB's. It will be understood that some power saving modes, such as the power gating mode, may be appropriate only if the segment does not have unread data, as transitioning the segment to the power saving mode may cause the data to be lost.

Figure 3A:
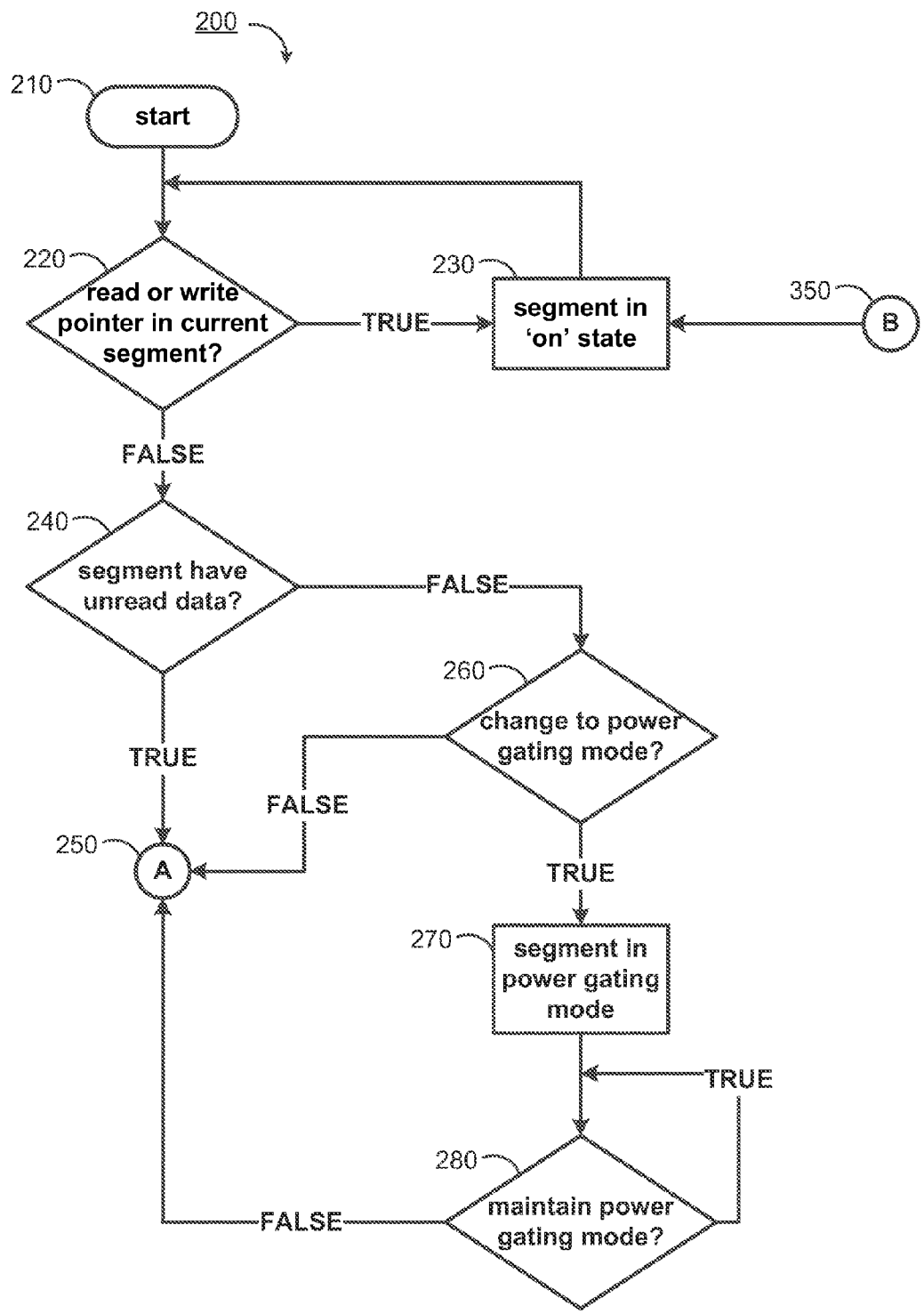
FIGS. 3A-3D are flow charts showing an inventive power-saving method for a FIFO buffer implemented in a memory.
Figure 3B:
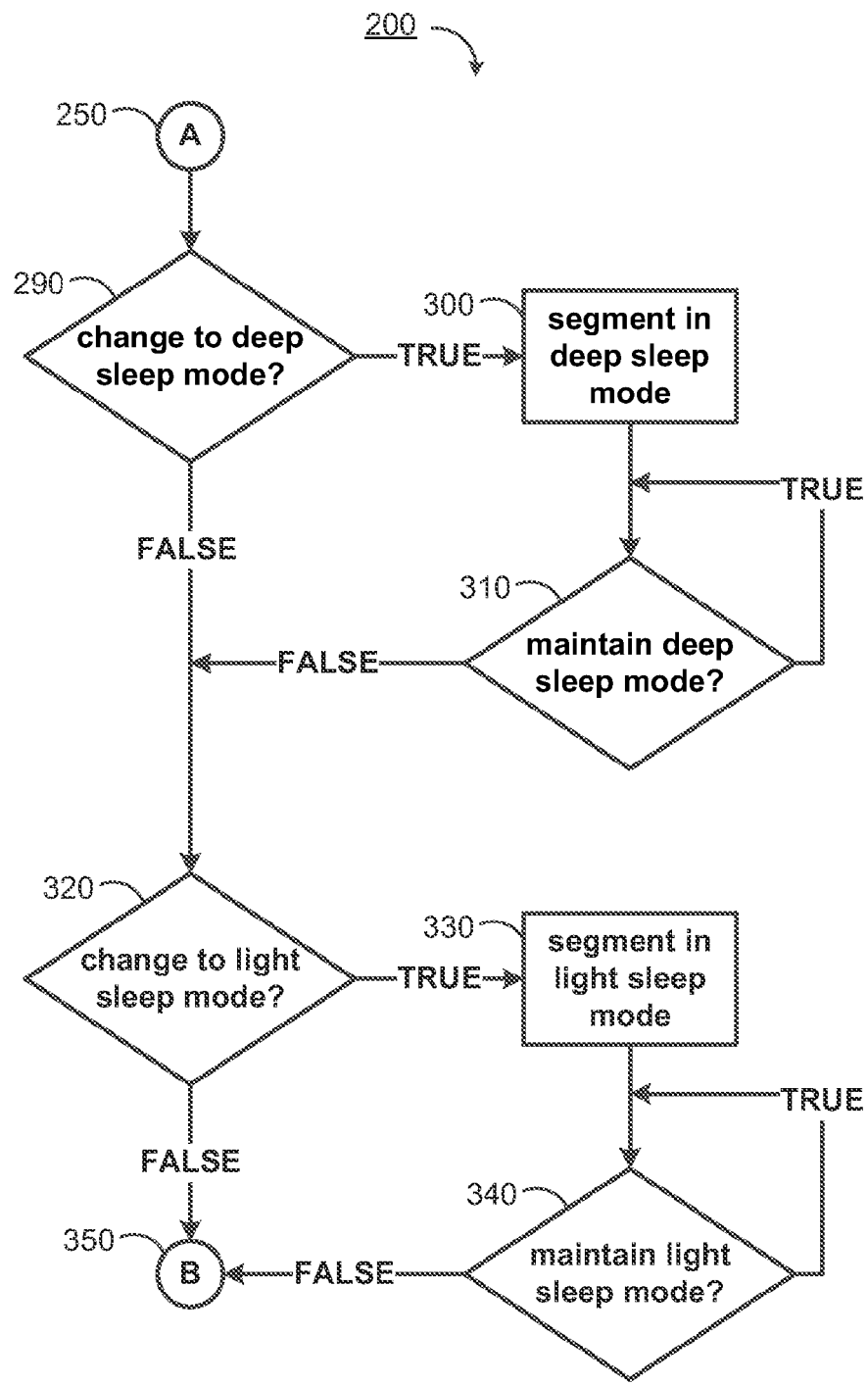

Thus, if decision block 240 determines that the RAM segment has unread data (TRUE), then the method continues in FIG. 3B as indicated by continuation marker 250; if not (FALSE), then decision block 260 determines whether the segment should be changed or transitioned to power gating mode; if not (FALSE), then the method continues in FIG. 3B as indicated by continuation marker 250; if so (TRUE), then the segment is put into power gating mode (step 270). Decision block 280 then determines whether the segment should maintain, or remain in, power gating mode. If so (TRUE), then the method loops and the segment is kept in power gating mode. If not (FALSE), then the method continues in FIG. 3B as indicated by continuation marker 250.

With reference to FIG. 3B, the method continues from continuation marker 250, and decision block 290 determines whether the segment should be changed or transitioned to deep sleep mode. If so (TRUE), then the segment is put into deep sleep mode (step 300). The decision block 310 then determines whether the segment should maintain, or remain in, deep sleep mode; if so (TRUE), then the method loops and the segment is kept in deep sleep mode; if not (FALSE), then the method proceeds to decision block 320. The method also proceeds to decision block 320 if decision block 290 determines that the segment should not be changed or transitioned to deep sleep mode (FALSE).

Continuing in the method, decision block 320 determines whether the segment should be changed or transitioned to light sleep mode. If so (TRUE), then the segment is put into light sleep mode (step 330). The decision block 340 then determines whether the segment should maintain, or remain in, light sleep mode; if so (TRUE), then the method loops and the segment is kept in light sleep mode; if not (FALSE), then the method continues in FIG. 3A as indicated by continuation marker 350. The method also continues in FIG. 3A as indicated by continuation marker 350 if decision block 320 determines that the segment should not be changed or transitioned to light sleep mode (FALSE).

Returning to FIG. 3A, the method continues via continuation marker 350, and the segment is changed or transitioned to the 'on', or operational, state. The method then loops to decision block 220, and the above repeats.

As discussed above, the power control logic is configured such that the above-described method changes or transitions any particular RAM segment into a power saving mode only if a net power saving will result and the recovery time from the power saving mode is such that the segment can be restored to the 'on' state before the read or write pointer arrives in the segment. This may be determined based on the minimum time for the current read or write pointer to reach the segment, the recovery time, and the transition overhead.

Figure 3C:
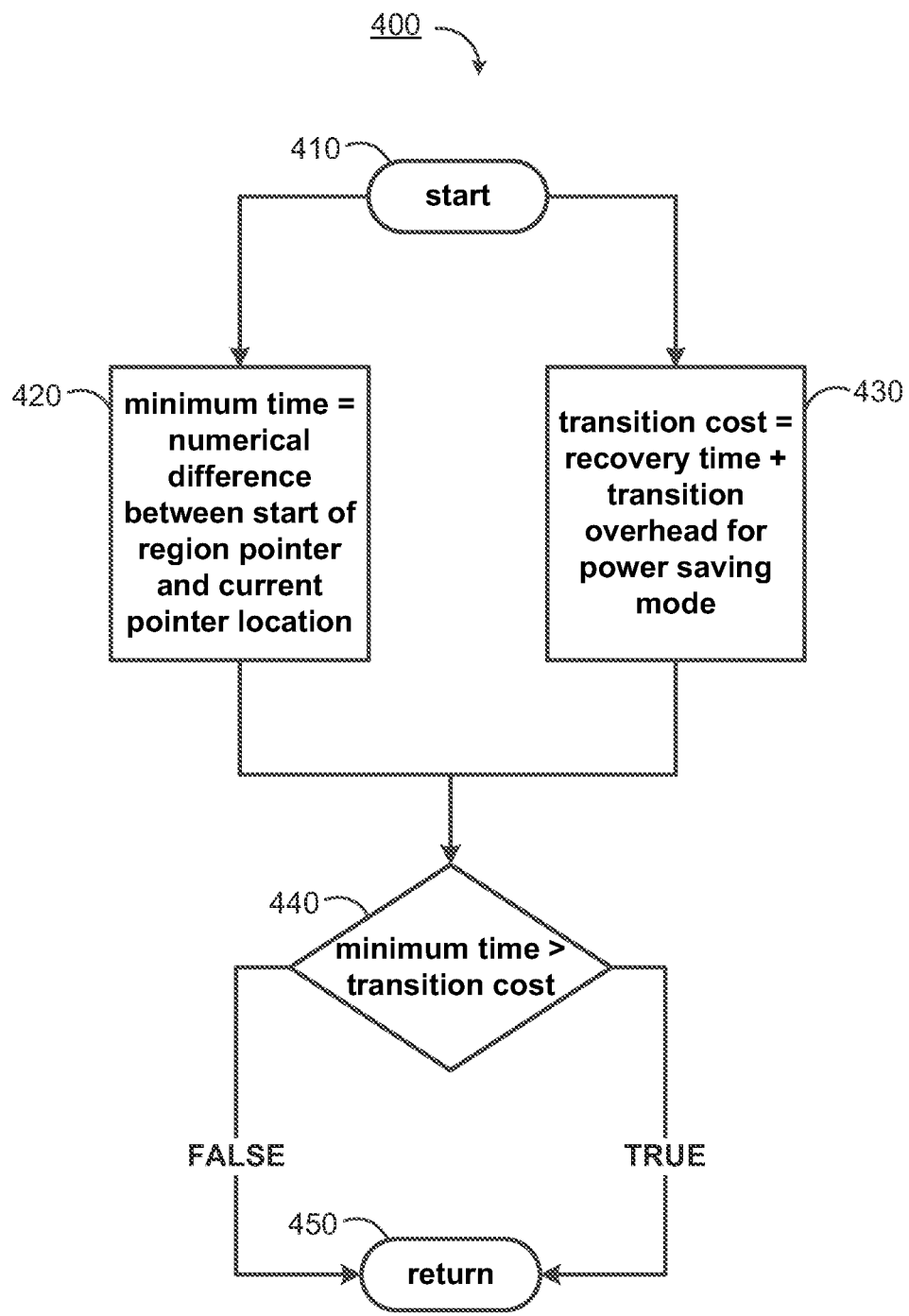

In one embodiment, in each instance where one of decision blocks 260, 290, 320 determines whether a RAM segment should be changed or transitioned to the power gating, deep sleep, or light sleep modes, respectively, the determination is made by the method 400 shown in FIG. 3C. Start indication block 410 indicates that the minimum time for the current pointer to reach the subject segment is determined (step 420); this may be determined as the numerical difference between the beginning of the segment and the current pointer location and thus indicates a minimum time in terms of a number of clock cycles. The start indication block 410 also indicates that the sum of the recovery time and the transition overhead for the subject segment for the particular power saving mode involved are determined 430 (in this connection, it will be recalled that the transition overhead may be expressed in terms of numbers of clock cycles, as described above, and thus the present sum is expressed as a number of clock cycles); this may be termed the transition cost and may be determined by accessing the configuration registers as discussed above. Decision block 440 then determines whether the minimum time is greater than the transition cost. The return indication block 450 indicates that the outcome of decision block 440 is returned and becomes the output of whichever one of decision blocks 260, 290, 320 is performing the method.

Figure 3D:
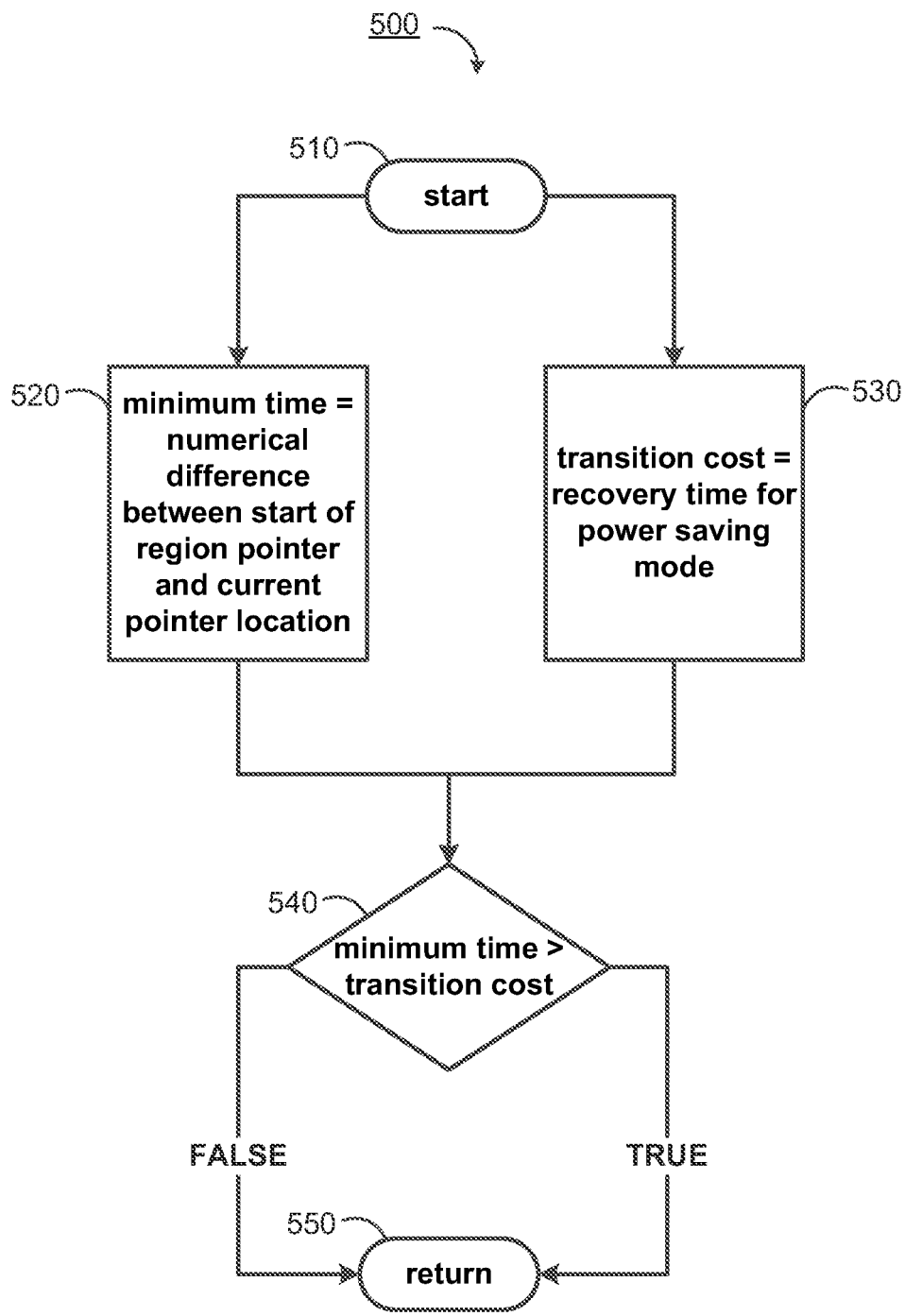

Similarly, in one embodiment, in each instance where one of decision blocks 280, 310, 340 determines whether a particular RAM segment should remain in the power gating, deep sleep, or light sleep modes, respectively, the determination is made by the method 500 shown in FIG. 3D. Start indication block 510 indicates that the minimum time for the current pointer to reach the subject segment is determined (step 520); this may be determined as the numerical difference between the beginning of the segment and the current pointer location which indicates a number of clock cycles, as above. The start indication block 510 also indicates that the recovery time for the subject segment and particular power saving mode involved is determined (step 530); this may be termed the transition cost and may be determined by accessing the configuration registers as discussed above. Decision block 540 then determines whether the minimum time is greater than the transition cost. The return indication block 550 indicates that the outcome of decision block is returned and becomes the output of whichever one of decision blocks 280, 310, 340 is performing the method.

In the above embodiments illustrated in FIGS. 3A-3D, when a first power saving mode is exited, a determination is made regarding any lower power saving modes as to whether a power saving may be achieved by entering the lower power saving mode. In such case, the RAM segment is not transitioned from the first power saving mode to the 'on' state directly, but is only thus transitioned if it is determined that no power saving can be achieved by transitioning instead to one of the lower power saving modes. In another embodiment, however, when it is determined that a power saving mode is to be exited, as illustrated in FIG. 3D, the RAM segment is instead transitioned immediately to the 'on' state without first determining whether a power saving may be achieved in a lower power saving mode. Having transitioned the RAM segment to the 'on' state, such a determination may be made subsequently regarding any lower power saving mode according to the method shown in FIG. 3C.

The FIFO buffer system and method described above provide power saving which is not known to be achieved using a traffic-based power management approach, wherein the latter is not known to save any power if traffic is regular, whereas the present system and method may save FIFO power in regular traffic flow cases as well. The system and method are flexible to adopt any number of memory segments which may be symmetric or asymmetric in size and parameters. The system and method account for power savings mode transition overhead and there is no performance degradation.

In the preceding description, for purposes of explanation, numerous details are set forth in order to provide a thorough understanding of the embodiments of the invention. However, it will be apparent to one skilled in the art that these specific details are not required in order to practice the invention. In other instances, well-known electrical structures and circuits are shown in block diagram form in order not to obscure the invention. For example, specific details are not provided as to whether the embodiments of the invention described herein are implemented as a software routine, hardware circuit, firmware, or a combination thereof.

Embodiments of the invention can be represented as a software product stored in a machine-readable medium (also referred to as a computer-readable medium, a processor-readable medium, or a computer usable medium having a computer-readable program code embodied therein). The machine-readable medium can be any suitable tangible medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention can also be stored on the machine-readable medium. Software running from the machine-readable medium can interface with circuitry to perform the described tasks.

The above-described embodiments of the invention are intended to be examples only. Alterations, modifications and variations can be effected to the particular embodiments by those of skill in the art without departing from the scope of the invention, which is defined solely by the claims appended hereto.

What is claimed is:

1. A power-saving method for a first-in-first-out (FIFO) buffer implemented in a memory, the method comprising:
   segmenting the memory into a plurality of logical segments; and
   for each one of the segments:
   a) determining a transition overhead for entering the segment into and exiting the segment out of a power saving mode, and further determining a recovery time for exiting the segment out of the power saving mode;
   b) determining a minimum time before a current pointer of the FIFO buffer can point to the segment;
   c) if the segment is not in the power saving mode, determining based on the minimum time, the transition overhead, and the recovery time whether a net power saving will result by entering the segment into the power saving mode and, if so, entering the segment into the power saving mode; and
   d) if the segment is in the power saving mode, exiting the segment out of the power saving mode when the minimum time is not greater than the recovery time.

2. The power-saving method according to claim 1, wherein step c) comprises determining whether the minimum time is greater than a sum of the transition overhead and the recovery time.

3. The power-saving method according to claim 2, wherein the memory operates according to a clock frequency, and the minimum time, the transition overhead, and the recovery time are determined as respective numbers of clock cycles.

4. The method according to claim 1, wherein the minimum time is determined based on a difference between a pointer to a start of the segment and the current pointer.

5. The method according to claim 1, wherein the transition overhead is determined based on a ratio between, firstly, a power consumed in entering and exiting the segment into and out of the power saving mode, and secondly, a power consumed per clock cycle when the segment is in an operational mode.

6. The method according to claim 1, wherein the power saving mode is a first power saving mode, the transition overhead is a first transition overhead, and the recovery time is a first recovery time, the method further comprising, for each one of the segments, repeating steps a) to d) wherein the power saving mode is a second power saving mode, the transition overhead is a second transition overhead, and the recovery time is a second recovery time.

7. The method according to claim 1, wherein, for each one of the segments, determining the transition overhead and the recovery time comprise retrieving the transition overhead and the recovery time from corresponding configuration registers.

8. The method according to claim 1, wherein, for each one of the segments, the power saving mode is a power gating mode, and wherein the segment is entered into the power saving mode only when the segment has other than unread data.

9. The method according to claim 1, wherein the memory is random access memory (RAM).

10. The method according to claim 9, wherein the wherein the RAM is segmented into $2^N$ logical segments, and the FIFO buffer has a depth of $2^D$, wherein D=1, 2, 3 . . . N.

11. A computer program product comprising a computer readable memory storing computer executable instructions thereon that when executed by a computer perform the method steps of claim 1.

12. A first-in-first-out (FIFO) buffer device comprising a FIFO buffer implemented in a memory, the device further comprising a power control logic coupled to the memory, the power control logic being configured:
   to segment the memory into a plurality of logical segments; and
   for each one of the segments:
      to determine a transition overhead for entering the segment into and exiting the segment out of a power saving mode, and further determine a recovery time for exiting the segment out of the power saving mode;
      to determine a minimum time before a current pointer of the FIFO buffer can point to the segment;
      if the segment is not in the power saving mode, to determine based on the minimum time, the transition overhead, and the recovery time whether a net power saving will result by entering the segment into the power saving mode and, if so, to enter the segment into the power saving mode; and
      if the segment is in the power saving mode, to exit the segment out of the power saving mode when the minimum time is not greater than the recovery time.

13. The FIFO buffer device according to claim 12, wherein the determination based on the minimum time, the transition overhead, and the recovery time comprises determining whether the minimum time is greater than a sum of the transition overhead and the recovery time.

14. The FIFO buffer device according to claim 13, wherein the memory operates according to a clock frequency, and the minimum time, the transition overhead, and the recovery time are determined as respective numbers of clock cycles.

15. The FIFO buffer device according to claim 12, wherein the minimum time is determined based on a difference between a pointer to a start of the segment and the current pointer.

16. The FIFO buffer device according to claim 12, wherein the transition overhead is determined based on a ratio between, firstly, a power consumed in entering and exiting the segment into and out of the power saving mode, and secondly, a power consumed per clock cycle when the segment is in an operational mode.

17. The FIFO buffer device according to claim 12, wherein, for each one of the segments, determining the transition overhead and the recovery time comprise retrieving the transition overhead and the recovery time from corresponding configuration registers.

18. The FIFO buffer device according to claim 12, wherein, for each one of the segments, the power saving mode is a power gating mode, and wherein the segment is entered into the power saving mode only when the segment has other than unread data.

19. The FIFO buffer device according to claim 12, wherein the memory is random access memory (RAM).

20. A power-saving method for a first-in-first-out (FIFO) buffer implemented in a memory, the method comprising:
   segmenting the memory into a plurality of logical segments corresponding to a plurality of non-overlapping physical segments of the memory;
   for each one of the logical segments:
      for each one of a plurality of power saving modes:
         determining a recovery time for transitioning the logical segment from the power saving mode to an operational mode;
         determining a recovery overhead for transitioning the logical segment from the power saving mode to the operational mode;
         determining a transition overhead for transitioning the logical segment from the operational mode to the power saving mode; and
         for each other one of the plurality of power saving modes, determining a transition overhead for transitioning the logical segment from the power saving mode to the other power saving mode;
   for each clock cycle of an operation of the memory:
      determining a minimum time before either a read pointer or a write pointer of the FIFO buffer points to the logical segment;
      if the logical segment is in the operational mode:
         determining a transition cost for transitioning the logical segment into one of the power saving modes and from the power saving mode to the operational mode based on:
            the recovery time for transitioning the logical segment from the power saving mode to the operational mode;
            the transition overhead for transitioning the logical segment from the operational mode to the power saving mode; and
            the recovery overhead for transitioning the logical segment from the power saving mode to the operational mode; and
         transitioning the logical segment to the power saving mode when the transition cost is less than the minimum time;
      if the logical segment is in one of the power saving modes, and the minimum time is not greater than the recovery time for transitioning the logical segment from the power saving mode to the operational mode, transitioning the logical segment from the power saving mode to another one of the power saving modes or to the operational mode.

* * * * *